United States Patent [19]
Casto et al.

[11] 4,118,789
[45] Oct. 3, 1978

[54] PROGRAM PROTECTION MODULE FOR PROGRAMMABLE CONTROLLER

[75] Inventors: Walter V. Casto, Solon; Lawrence W. DeLong, Stow; Theodore J. Markley, Mentor; Odo J. Struger, Chagrin Falls, all of Ohio

[73] Assignee: Allen-Bradley Company, Milwaukee, Wis.

[21] Appl. No.: 804,146

[22] Filed: Jun. 6, 1977

[51] Int. Cl.² ............................................. G06F 13/00
[52] U.S. Cl. ................................................. 364/900
[58] Field of Search ........................ 364/900 MS File

[56] References Cited
U.S. PATENT DOCUMENTS 3,978,454  8/1976  Willard .............................. 364/900

*Primary Examiner*—Raulfe B. Zache
*Attorney, Agent, or Firm*—Quarles & Brady

[57] ABSTRACT

A program protection module for a programmable controller checks the critical, or protected, portion of the control program each time the controller is switched to the run mode. This is accomplished by reading each control program instruction out of the controller memory and comparing it with a corresponding control instruction stored in a nonaccessible read-only memory. If all the compared control instructions are identical, the module sets a status bit in the programmable controller which enables the protected portion of the control program to be executed. If identity is not found, an alarm is generated and the protected program is not executed.

9 Claims, 7 Drawing Figures

PROGRAM PROTECTION MODULE FOR PROGRAMMABLE CONTROLLER

BACKGROUND OF THE INVENTION

The field of the invention is industrial digital control systems, and particularly, programmable controllers such as that disclosed in U.S. Pat. No. 3,942,158 issued Mar. 2, 1976, and entitled "Programmable Logic Controller".

Programmable controllers are typically connected to industrial equipment such as assembly lines and machine tools to sequentially operate the equipment in accordance with a stored control program. In programmable controllers such as that disclosed in the above cited patent, for example, the control program is stored in a random access memory and includes instructions which are executed in rapid sequence to examine the condition of selected sensing devices on the controlled equipment and instructions which energize or deenergize selected operating devices on the controlled equipment contingent upon the status of one or more of the examined sensing devices.

The control program instructions are loaded into the random access memory by the user who employs a program panel such as that disclosed in U.S. Pat. No. 3,813,649 entitled "Controller Program Editor" or that disclosed in U.S. Pat. No. 4,070,702 issued Jan. 24, 1978, and entitled "Contact Histogram for Programmable Controller". Such program panels include a number of editing features which allow the user to delete, add and shift controller instructions within the control program. In other words, typical program panels allow the user access to that portion of the random access memory which stores the control program so that he can load and edit the control program which suits his own particular application.

Although user access to the entire control program storage area is highly desirable, there are instances in which it is critical that part of the control program should not be changed once it is entered and edited. If the user is to be allowed access to the control program portion of the memory to edit the other noncritical portions of the control program, therefore, some means for protecting the critical portion from unauthorized or inadvertent changes is required.

SUMMARY OF THE INVENTION

The present invention relates to a program protection module which checks the critical, or protected, portion of the control program each time the programmable controller is switched to the "run" mode of operation. More specifically, the program protection module includes means for sequentially comparing each control instruction in the protected portion of the control program with corresponding control instructions stored in a nonaccessible memory. If all compared instructions are identical, the program protection module sets a status bit in the programmable controller which enables the protected portion of the control program to be executed. If identity is not found, the status bit is not set and the protected portion of the control program is not executed.

A general object of the invention is to check the protected portion of the control program each time the controller mode switch is changed to the run position. The program protection module periodically examines the mode of operation of the programmable controller, and when the run mode is entered, it sequentially reads out of the controller memory each control instruction in the protected portion of the control program and compares it with a corresponding instruction stored in a separate memory which is not accessible to the user through a program panel. If identity is found, a selected status bit in the controller memory is set to a preselected state by the program protection module.

Another object of the invention is to "fence off" a portion of the controller program which is to be protected from alteration. The protected portion of the control program is preceded by a set of instructions which examine the program protection module status bit and depending on its state, either execute the protected program control instructions or effectively jump those instructions. Immediately following the protected portion of the control program is a special "end of protected program" instruction which indicates to the program protection module that all protected controller instructions have been compared.

Another object of the invention is to provide a program protection module which operates asynchronously with respect to the programmable controller processor. The program protection module includes a separate processor which periodically interrupts the programmable controller processor to steal a memory cycle therefrom. During such memory cycles data is read out of the controller memory to the program protection module and data is written into the controller memory by the module. A module status register comprised of a selected line in the controller memory serves as a communication link between the controller processor and the program protection module processor.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
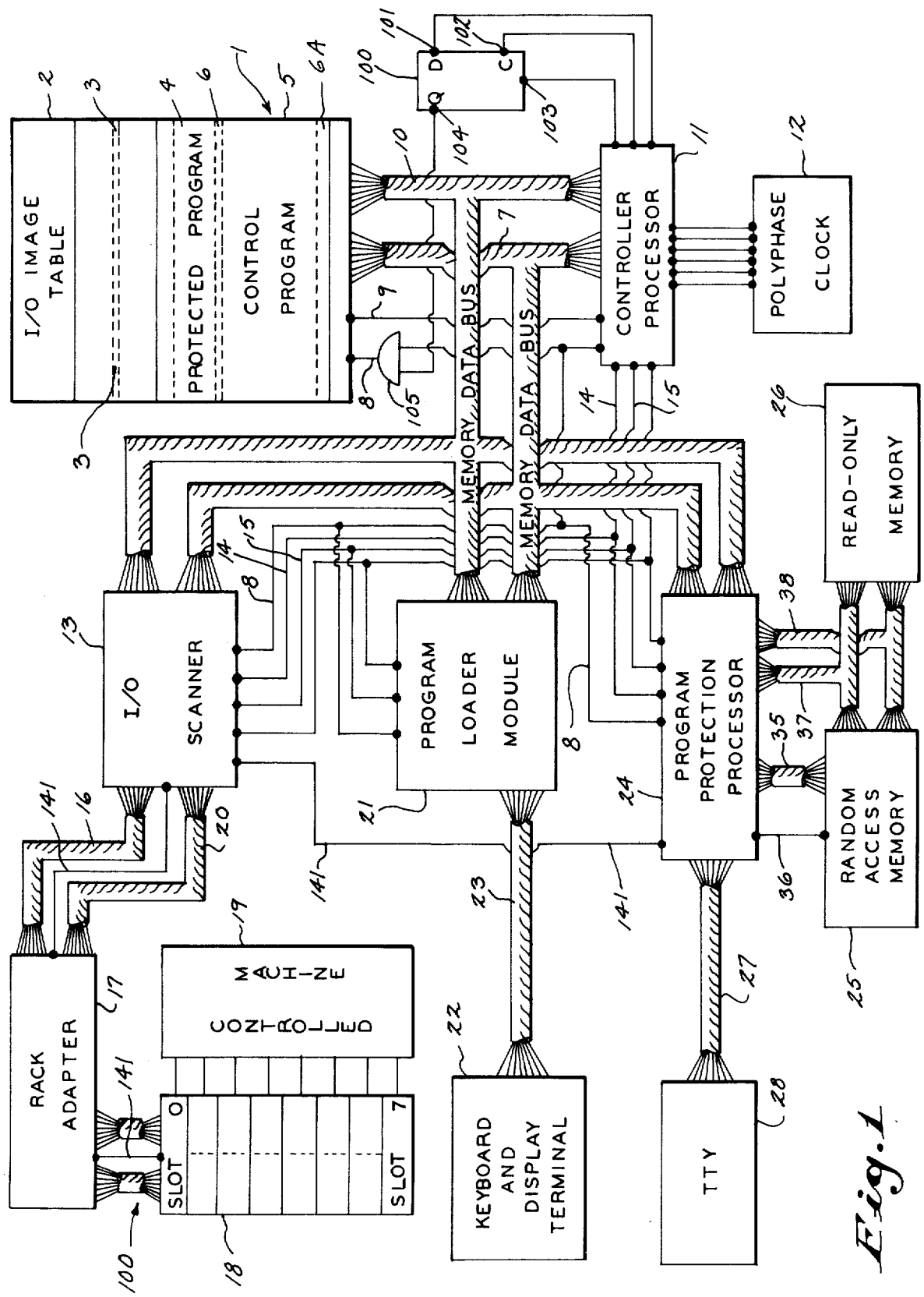
FIG. 1 is an electrical schematic diagram of a programmable controller which employs the program protection module of the present invention.

Referring particularly to FIG. 1, the programmable controller includes a random access read/write memory 1 which has an eighteen-bit word length and which includes from 2,048 to 8,192 separately addressable lines depending upon the size of the control program which it is to store. Two bits in each word stored in the memory 1 are used for parity checking, and thus, sixteen data bits are stored on each line of the memory 1. An output image table is stored on the first sixty-four lines of the memory 1 and each line is separately addressable with the octal addresses 000-077. An input image table is stored on the next sixty-four lines of the memory 1 and each line is separately addressable with the octal addresses 100-177. Together, the first 128 lines of the memory 1 form an I/O image table 2. Preset and accumulated values of counters and timers are stored next in the memory 1 along with a line at octal address 276 which comprises a protected program module status register 3. A control program 5 comprised of controller instructions is stored at octal memory locations one thousand and higher and a protected program portion 4 is stored at the beginning thereof. The size of the protected program portion 4 of the control program varies in each system and the boundary between it and the remainder of the control program 5 is, therefore, not fixed. An end of protected program word 6 (OTE 27602) defines this boundary and an end of program word 6A (END) defines the end of the control program 5. The end of program word 6A resets the program counter (not shown in the drawings) to the octal address one thousand to commence the next scan.

Selected data is read from the memory 1 by applying the proper octal address to a memory address bus 7 and applying a logic low voltage to a read/write line 8. The memory 1 is cycled by applying a logic high pulse to a memory cycle line 9 and the addressed word is read out on a memory data bus 10. A word is loaded, or written into a selected line of the memory 1 by applying the octal address of that line to the memory address bus 7, applying a logic high voltage to the read/write line 8 and applying a logic high voltage pulse to the memory cycle line 9. The sixteen-bit data word appearing on the memory data bus 10 during the one-microsecond cycle time of the memory 1 is written into the selected line of the memory 1.

The control program 5 is executed by a controller processor 11 which connects the memory buses 7 and 10 and to the control lines 8 and 9. In response to one-megahertz clock pulses generated by a polyphase clock 12, the controller processor 10 continuously and sequentially reads out the instructions of the control program 5 from the memory 1, and in response to an operation code contained within each program instruction, it performs the operations necessary to carry out the controller functions. Such operations include, for example, examining a status bit in the I/O image table 2 or setting a status bit in the I/O image table 2 to a desired state.

Each status bit in the output portion of the I/O image table 2 may correspond with an operating device such as a motor starter or solenoid on a system being controlled, and each status bit in the input portion of the I/O image table 2 may correspond with a sensing device such as a limit switch or a photoelectric cell on the controlled system. This correspondence is achieved by connecting all of the sensing and operating devices on the system being controlled to separately addressable input and output circuits on I/O interface racks, one of which is indicated at 100. Each status bit of the I/O image table 2 is periodically updated by coupling the status of the corresponding sensing device or operating device on the controlled system with the memory 1. This function is performed by an I/O scanner circuit 13 which connects with the processor 11 through an interrupt line 14 and a grant line 15 and which connects directly to the memory data bus 10, the memory address bus 7, and the read/write line 8. The scanner circuit 13 periodically couples the memory data bus 10 to an I/O data bus 16 which connects to a rack adapter 17 on each of the I/O interface racks 100. The rack adapter 17 connects to eight separately addressable I/O slots 18, each of which may include sixteen addressable input or output circuits that connect to the operating and sensing devices on the controlled machine 19. An I/O slot may also include word oriented modules such as those disclosed in copending U.S. patent application Ser. No. 696,138 entitled "Asynchronous Coupling of Data Between a Word-Oriented I/O Module and the Memory of a Programmable Controller". An I/O address bus 20 connects the rack adapter 17 to the scanner circuit 13, and each rack adapter 17 includes decoding circuitry which is responsive to three bits in the six-bit address code on the bus 20 to enable the I/O interface rack 100 when its rack number is detected. Each rack adapter 17 also includes decoding circuitry which is operable to enable one of the slots 0-7 in response to the three remaining bits on the I/O address bus 20.

The I/O scanner circuit 13 periodically "steals" a memory cycle from the processor 11 to read a sixteen-bit word in the output portion of the I/O image table 2 of the memory 1 and couple that word through the I/O data bus 16 to a selected rack and slot which is identified by an address on the I/O address bus 20. Also, the scanner circuit 13 periodically reads the status of the sixteen bits in an addressed slot and couples the sixteen-bit data word to an addressed line in the input portion of the I/O image table 2 in the memory 1. Thus, by periodically stealing a memory cycle from the processor 11, the I/O scanner circuit 13 updates the input portion of the I/O image table 2 with the current status of the sensing devices on the controlled machine 19, and periodically updates the state of the operating devices on the controlled machine 19 by coupling the current status of the output portion of the I/O image table 2 to the proper rack adapter 17.

A controller program loader interacts with the controller processor 11 and the read/write memory 1 on a similar "cycle steal" basis. The controller program loader includes a program loader module 21 which connects to the memory address bus 7, the memory data bus 10, the interrupt line 14 and the grant line 15. The program loader module 21 operates in response to programs stored in its read-only memory (not shown in the drawings) to load a control program into the controller read/write memory 1 and to perform a number of editing functions on it. The control program instructions are entered through a keyboard that forms part of a keyboard and display terminal 22 which connects to the program loader module 21 through a cable 23. For a more detailed description of the program loader module 21 and keyboard and display terminal 22 reference is made to U.S. Pat. No. 4,070,702 which issued on Jan. 24, 1978, and is entitled "Contact Histogram for Programmable Controller".

The program protection module of the present invention also couples to the read/write memory 1 and periodically steals a memory cycle from the processor 11 to carry out its functions. The program protection module includes a program protection processor 24, a random access memory (RAM) 25 and a read-only memory 26. The program protection processor 24 connects to the memory address bus 7, the memory data bus 10, the read/write control line 8, the interrupt line 14 and the grant line 15. As will become apparent from the description to follow, the program protection processor 24 reads selected control instructions out of the read/write memory 1 and compares them with control instructions stored in its associated read-only memory 26. Control instructions read out of the memory 1 may also be coupled through a cable 27 to a TTY 28.

Figure 2:
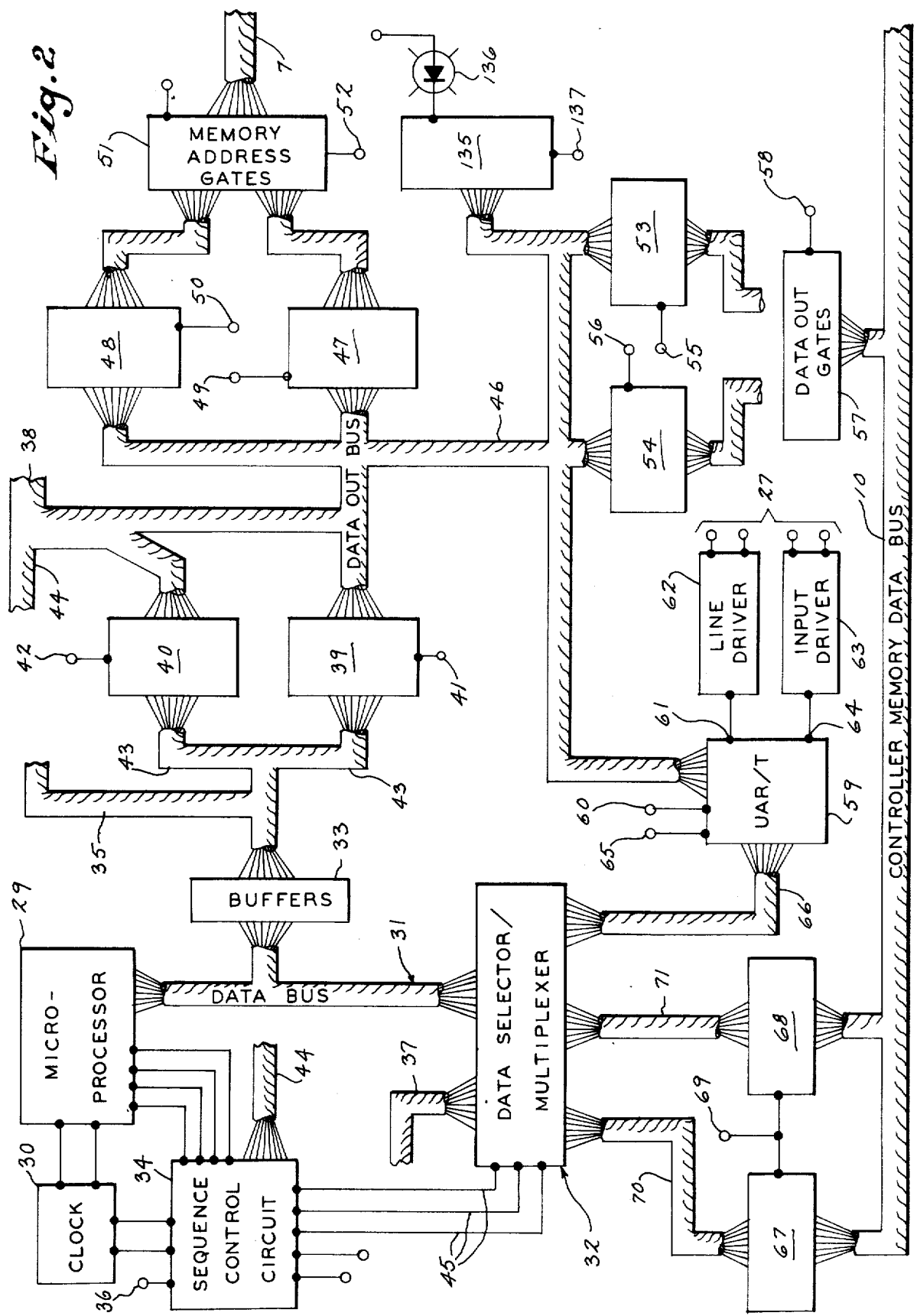
FIG. 2 is an electrical schematic diagram of the program protection processor which forms part of the system of FIG. 1.

Referring particularly to FIGS. 1 and 2, the program protection processor 24 includes an eight-bit microprocessor 29 such as that sold commercially by the Intel Corporation as Model 8008. The microprocessor 29 is driven by a 500 khz. two-phase clock 30 and is connected through an eight-bit data bus 31 to a number of input and output ports. The input ports are coupled to the data bus 31 by an eight-port data selector/multiplexer 32 which is formed by sixteen parallel connected commercially available 4-line-to-1-line data selectors. The data bus 31 is coupled to the output ports through a set of eight buffers 33.

Figure 4:
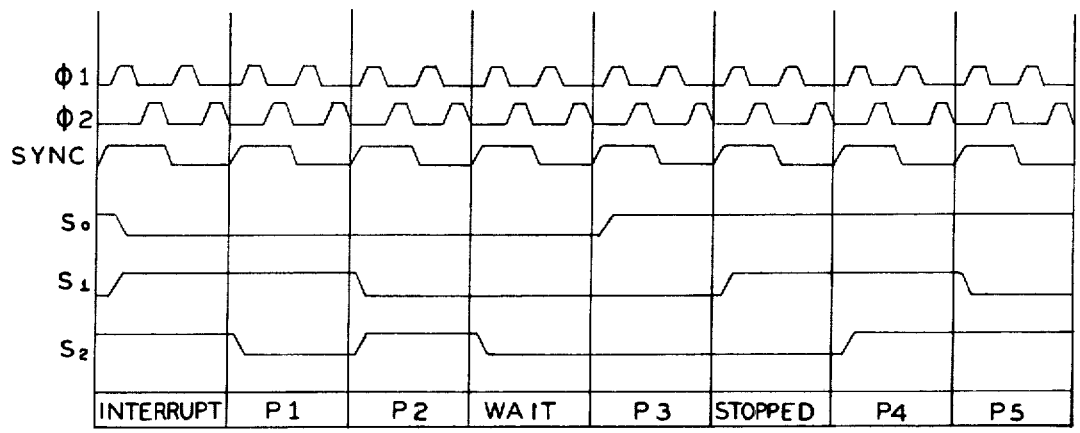
FIG. 4 is a graphic illustration of control signals which appear in the control circuit of FIG. 3, and FIGS. 5–7 are a flow chart of the program executed by the microprocessor which forms part of the program protection processor of FIG. 2.

The microprocessor 29 controls the use of the data bus 31 and determines whether it will be conducting input or output data. As shown in FIG. 4, processor state signals $S_0$, $S_1$ and $S_2$, along with a timing signal, SYNC, inform the supporting circuitry of the state of the microprocessor 29. A table of the binary state signals and the designated state names is as follows:

| MICROPROCESSOR | | | |
|---|---|---|---|
| $S_0$ | $S_1$ | $S_2$ | STATE |
| 0 | 1 | 0 | P1 |
| 0 | 1 | 1 | INTERRUPT |
| 0 | 0 | 1 | P2 |
| 0 | 0 | 0 | WAIT |
| 1 | 0 | 0 | P3 |
| 1 | 1 | 0 | STOPPED |
| 1 | 1 | 1 | P4 |
| 1 | 0 | 1 | P5 |

These state signals and the SYNC signal are applied to a sequence control circuit 34 which operates the supporting circuitry now to be described. For a more detailed description of the microprocessor 29, including its capabilities, the manner in which it operates and the manner in which it interrelates with the supporting circuitry, reference is made to "8008 8 Bit Parallel Central Processor Unit Users Manual", published by the Intel Corporation on November, 1973.

Referring particularly to FIGS. 1 and 2, the buffers 33 connect to the random access memory (RAM) 25 through an eight-bit memory data out cable 35. The RAM 25 supplements the storage registers contained within the microprocessor 29 and is comprised of eight sixty-four bit memory chips arranged to store sixty-four separately addressable eight-bit words. An addressed word is read from the RAM 25 when a logic high voltage is applied to a read/write line 36 and a word is written into an addressed line when a logic low is applied to the line 36. Data read out of the RAM 25 is coupled through a memory data in cable 37 which connects to one of the eight-bit input ports on the multiplexer 32.

The memory data in cable 37 also connects to the read-only memory 26 to convey eight-bit data words read therefrom. The read-only memory 26 is comprised of thirty-eight ultraviolet light erasable programmable read-only memory chips (proms) such as Ser. No. 1702 sold commercially by the Intel Corporation. The read-only memory 26 provides storage for 9,728 eight-bit words. The memory 26 stores the control program for the program protection module as well as the "master" protected controller program.

The memory lines in both the RAM 25 and the read-only memory 26 are separately addressable through a memory address cable 38. The eight least significant digit leads in the memory address cable 38 connect to the outputs of an eight-bit data latch 39 and the six most significant digit leads connect to six outputs on a second eight-bit data latch 40. The data latches 39 and 40 are each comprised of eight D-type flip-flops having their clock terminals commonly connected to respective clock lines 41 and 42 and their D inputs connected to respective outputs of the buffers 33 through a cable 43. The clock lines 41 and 42 connect to the sequence control circuit 34, and when a logic high is applied to either of them an eight-bit word on the cable 43 is stored in the respective data latch 39 or 40.

The output terminals on the data latches 39 and 40 also connect to the sequence control circuit 34 through a cable 44. A code generated on the cable 44 indicates the function which is to be performed by the microprocessor supporting circuitry. For example, this code determines how the read/write line is to be controlled by the sequence control circuit 34, and it determines which input port is to be selected by operating the data selector 32 through three leads 45.

Connected to the eight output terminals on the data latch 39 is an eight-lead data out bus 46 which couples data from the microprocessor 29 to the controller memory address bus 7, the controller memory data bus 10, an error latch 135, or the TTY 28. More specifically, the data bus 46 connects to eight input terminals on a first eight-bit controller address latch 47 and to the eight input terminals on a second eight-bit controller address latch 48. The latches 47 and 48 are each comprised of eight D-type flip-flops having their clock terminals commonly connected to the sequence control circuit 34 through respective leads 49 and 50. The Q output of each flip-flop in the address latches 47 and 48 connects to respective input terminals on fifteen memory address gates and one read/write gate 51. The gates 51 are NAND gates each having one input connected to a latch 47 and 48 and a second input commonly connected to the sequence control circuit 34 through an enable line 52. The output on each of fifteen of the NAND gates 51 connects to a lead in the controller memory address bus 7 and the output of the sixteenth NAND gate 51 connects to the controller read/write line 8.

The data out bus 46 connects to the inputs of the 8-bit error latch 135 which is comprised of D-type flip-flops. A Q output on one of these flip-flops connects to a light emitting diode 136 and its clock terminal connects to the sequence control circuit 34 through a lead 137. When clocked through the lead 137, the light emitting diode is either energized or de-energized in accordance with the data on the bus 46. In this manner, when an error in the protected program is detected, the operator is visually alerted and the source of the error can be sought by use of the program loader.

The data out bus 46 also connects to the eight input terminals on a first controller data latch 53 and to eight input terminals on a second controller data latch 54. Each data latch 53 and 54 is comprised of eight D-type flip-flops having their clock terminals commonly connected to the sequence control circuit 34 through clock leads 55 and 56 and their Q outputs connected to respective inputs on sixteen data out gates 57. The data out gates 57 are NAND gates each having a second input commonly connected to the sequence control circuit 34 through an enable line 58 and an output terminal connected to respective leads in the controller memory data bus 10.

And finally, the data out bus 46 connects to eight parallel data input terminals on a universal asynchronous receiver/transmitter (UAR/T) 59. The UAR/T 59 is a commercially available circuit such as the AY-5-1013 manufactured by the Microelectronics Division of The General Instrument Corporation which receives and stores the eight bits on the data out bus 46 when a logic high voltage is applied to a transmit strobe line 60. The strobe line 60 connects to the sequence control circuit 34 and when it is driven high, the eight bits of data on the bus 46 are transmitted serially through an output terminal 61 to a line driver 62. The line driver amplifies the digital output data to a form suitable for transmission on the cable 27 to the TTY 28.

The UAR/T 59 also receives eight-bit bytes of serial data from the TTY 28 through an input circuit 63 which connects to a serial data in terminal 64. The input circuit provides optical isolation and converts the digital signals received on the cable 27 to a logic level. When a logic high voltage appears on a receive line 65, the UAR/T 59 couples the eight-bit byte of serially received data to the data selector 32 through a cable 66.

The data selector/multiplexer 32 also receives data from the controller memory data bus 10 through two eight-bit input ports. A pair of eight-bit input data latches 67 and 68, each comprised of eight D-type flip-flops, connect to the sixteen leads in the controller memory data bus 10. The clock terminals on each flip-flop are commonly connected to the sequence control circuit 34 through a clock lead 69, and when a logic high voltage is applied thereto, a sixteen-bit data word is stored in the latches 67 and 68 and appears at the sixteen Q outputs. The eight Q outputs of the input data latch 67 are connected through an eight-lead bus 70 to one input port on the multiplexer 32 and the eight Q outputs on the input data latch 68 connect to a second input port through a bus 71.

Figure 3:
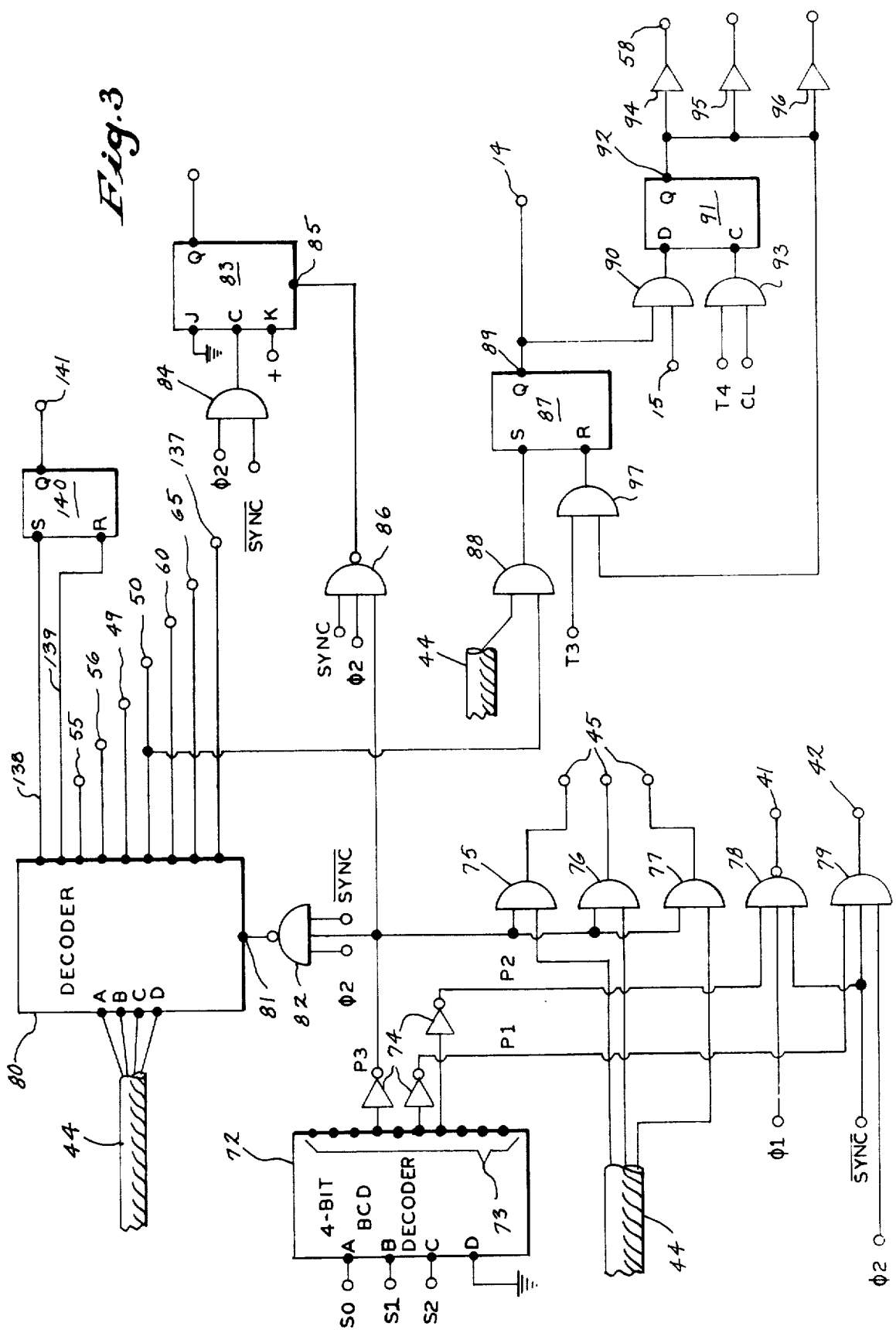
FIG. 3 is an electrical schematic diagram of the sequence control circuit which forms part of the processor of FIG. 2.

The $S_0$, $S_1$, $S_2$ and SYNC signals generated by the microprocessor 29 along with the $\phi 1$ and $\phi 2$ signals generated by the clock 30 operate the sequence control circuit 34 to control the supporting circuitry. Referring particularly to the circuit diagram of the sequence control circuit 34 in FIG. 3, the $S_0$, $S_1$ and $S_2$ signals are received at the a-c inputs of a four-bit BCD decoder 72. The BCD decoder 72 is a commercially available integrated circuit having its D input connected to signal ground and having a set of ten output terminals 73. A logic low voltage is generated at the fourth output terminal 73 during the P3 time period, at the sixth output terminal 73 during the P1 time period, and at the seventh output terminal 73 during the P2 time period. The outputs 73 coupled through inverter gates 74 to generate logic high timing signals. The P3 timing signal is applied to one input on a first AND gate 75, to one input on a second AND gate 76 and to one input on a third AND gate 77. A second input on the AND gate 75 connects to receive the tenth digit from the data latch 40 through the cable 44, a second input on the AND gate 76 connects to receive the eleventh digit and a second input on the AND gate 77 connects to receive the twelfth digit. The outputs of the AND gates 75, 76 and 77 control the data selector/multiplexer 32 through the leads 45 by generating a three-bit binary coded number thereon which selects one of the eight input ports during the P3 time period.

The P2 timing signal terminal 73 connects to one input on a NAND gate 78. A second input on the NAND gate 78 connects to receive the $\phi 1$ timing signal from the clock 30 and a third input thereon connects to receive the $\overline{\text{SYNC}}$ timing signal from the microprocessor 29. Its output terminal controls the data latch 39 through the lead 41. The P1 timing signal terminal 73 connects to one input on an AND gate 79, a second input on the AND gate 79 connects to receive the $\phi 2$ timing signal and a third input thereon connects to receive the $\overline{\text{SYNC}}$ timing signal. The output of the AND gate 79 controls the data latch 40 through the lead 42.

The controller data latches 53 and 54, the address latches 47 and 48, and the UAR/T 59 are controlled by a four-line-to-sixteen-line decoder 80. The decoder 80 is a commercially available integrated circuit having a set of inputs A-D connected respectively to receive the tenth, eleventh, twelfth and thirteenth digits through the cable 44. The decoder includes a set of sixteen output terminals, the first seven of which connect to the respective leads, 55, 56, 49, 50, 60, 65 and 137 to control the above listed circuit elements.

In addition, a pair of leads 138 and 139 connect to two outputs on the decoder 80 and to the R and S inputs respectively of a flip-flop 140. The Q output on the flip-flop 140 connects to a reset line 141, which as shown best in FIG. 1, connects through the I/O scanner 13 to each of the I/O interface racks 100. When the reset line 141 is driven to a logic high voltage, all operating devices on the controlled machine 19 are effectively decontrolled by decoupling them from the programmable controller.

In response to the four-bit operation code applied to its inputs A-D, the decoder generates a logic low voltage at one of its sixteen output terminals when a logic low voltage is applied to a clock terminal 81. The clock terminal 81 is driven by a NAND gate 82 which has one input connected to receive the P3 timing signal, a second input connected to receive the $\phi 2$ timing signal, and a third input connected to receive the $\overline{\text{SYNC}}$ timing signal.

The read/write line 36 which controls the RAM 25 is driven by a J-K flip-flop 83. The J input on the flip-flop 83 is driven by an AND gate 84. One input on the AND gate 84 connects to receive the $\phi 2$ timing signal, and a second input thereon connects to receive the $\overline{\text{SYNC}}$ timing signal. A preset input terminal 85 on the J-K flip-flop 83 connects to the output of a NAND gate 86. One input on the NAND gate 86 connects to receive the P3 timing signal, a second input connects to receive the $\phi 2$ timing signal, and a third input connects to receive the SYNC timing signal. In response to the logic state of these signals, the flip-flop 83 is set or reset during the P3 timing period to either read a word from the RAM 25 or write a word into it.

Direct access to the memory 1 of the programmable controller is initiated after a memory address has been loaded into the address latches 47 and 48. More specifically, an R-S flip-flop 87 has its set input connected to the output of an AND gate 88, which in turn has one input connected to receive the seventh digit in the cable 44 and a second input connected to the control line 50 which leads to the second address latch 48. The flip-flop 87 is set when an interrupt is to be requested and a logic high voltage is generated at its Q output 89 which connects to the controller interrupt line 14. The Q output 89 also connects to one input on an AND gate 90 which drives the D input on a D-type flip-flop 91. A second input on the AND gate 90 connects to the controller grant line 15 and when the interrupt is granted, the flip-flop 91 is set to generate a logic high voltage at its Q output terminal 92. The flip-flop 91 is clocked by T4 and C1 timing signals which are received from the programmable controller and applied to the C input through an AND gate 93. The resulting logic high generated at the Q output 92 during the one-microsecond interrupt is applied through buffers 94, 95, and 96 to the respective lines 58, 52, and 69 which control the data out gates 57, the memory address gates 51, and the input data latches 67 and 68. This logic high voltage is also coupled through an AND gate 97 to the reset terminal on the R-S flip-flop 87. The AND gate 97 is enabled by the T3 timing signal received from the programmable controller. For a more detailed description of the manner in which the one-microsecond interrupt is granted and terminated, reference is made to the above cited U.S. Pat. No. 3,942,158.

The function to be performed by the microprocessor's supporting circuitry is thus determined by instructions which are read out of the microprocessor 29 and stored in the data latches 39 and 40. Those instructions which relate to the program protection module functions are as follows:

As indicated previously, these instructions and the other instructions which comprise the program protection module routines are stored in the read-only memory 26. The microprocessor 29 reads these instructions out of the memory 26 in the proper sequence and executes them. These routines will be described hereinafter with reference to the flow charts shown in FIGS. 5-7.

Before discussing in detail the functions performed by the protected program processor 24 and the manner in which it operates to carry them out, a further description of the operation of the programmable controller to which it is attached will be made.

Referring again to FIG. 1, there are three general types of program instructions executed by the programmable controller processor 11. A program instruction which calls for an operation involving a selected bit in either the output portion or input portion of the image table 2, or the module status register 3 includes an eight-bit operand address which indicates the memory address of the word containing the desired bit and a four-bit pointer that identifies which of the sixteen bits in the addressed word is selected. Such program instructions are referred to hereinafter as bit instructions and they include the following:

TABLE I

| Operation | Op Code | | | | Pointer | | | | Operand Address | | | | | | | | Execution Time |
|---|---|---|---|---|---|---|---|---|---|---|---|---|---|---|---|---|---|
| XIC/XOE | 0 | 0 | 1 | 0 | P | P | P | P | A | A | A | A | A | A | A | A | |
| XIO/XOD | 0 | 0 | 1 | 1 | P | P | P | P | A | A | A | A | A | A | A | A | 2 μsec. |
| OTU | 1 | 1 | 0 | 0 | P | P | P | P | A | A | A | A | A | A | A | A | |
| OTL | 1 | 1 | 0 | 1 | P | P | P | P | A | A | A | A | A | A | A | A | |
| OTD | 1 | 1 | 1 | 0 | P | P | P | P | A | A | A | A | A | A | A | A | 3 μsec. |
| OTE | 1 | 1 | 1 | 1 | P | P | P | P | A | A | A | A | A | A | A | A | |
| INSTRUCTION BIT NUMBER (OCTAL) | 17 | 16 | 15 | 14 | 13 | 12 | 11 | 10 | 7 | 6 | 5 | 4 | 3 | 2 | 1 | 0 | |

The mnemonic operation codes for the bit instructions are briefly defined as follows:

XIC — Examine bit closed or, is the bit in a logic 1 state?

XOE — Same as XIC, but refers to a bit in the output portion of image table.

XIO — Examine bit open or, is the bit in a logic 0 state?

XOD — Same as XIO, but refers to a bit in the output portion of the image table.

OTU — If conditions are true latch bit off, or to a logic 0 state, and if false do nothing.

OTL — If conditions are true latch bit on, or to a logic 1 state, and if false do nothing.

OTD — If conditions are true turn bit off and if conditions are false turn bit on.

OTE — If conditions are true turn bit on and if conditions are false turn bit off.

A second general type of program instruction is executed by the controller processor 11 to perform either a control or logical function. Such instructions are referred to hereinafter as control instructions and are comprised solely of an operation code. They include the following:

| Input Instructions | | |
|---|---|---|
| Mnemonic | Bit Pattern | Comment |
| INP MEM | 01000001 | Read data from memories 25 and 26. |
| INP RECEV | 01000011 | Input data from UAR/T 59. |
| INP PLCLI | 01000101 | Input data from latch 67. |
| INP PLCLH | 01000111 | Input data from latch 68. |
| INP SUART | 01001111 | Received data present at UAR/T 59. |

| Output Instructions | | |
|---|---|---|
| Mnemonic | Bit Pattern | Comment |
| OUT PLCLO | 01010001 | Load data in latch 53. |
| OUT PLCHO | 01010011 | Load data in latch 54. |
| OUT PLCLA | 01010101 | Load address in latch 47. |
| OUT PLCHA | 01010111 | Load address in latch 48. |
| OUT TRANS | 01011001 | TRANSMIT data from UAR/T 59. |
| OUT CLRDA | 01011011 | Acknowledge received data from UAR/T 59. |
| OUT 20 | 01100001 | Set flip-flop 140 to decontrol operating devices. |
| OUT 21 | 01100011 | Reset flip-flop 140. |
| OUT 24 | 01101001 | Output data to error latch 135. |

TABLE II

| Operation | Operation Code | | | | | | | | | | | | | | | | Execution Time |
|---|---|---|---|---|---|---|---|---|---|---|---|---|---|---|---|---|---|
| NOP | 0 | 0 | 0 | 0 | 0 | 0 | 0 | 0 | 0 | 0 | 0 | 0 | 0 | 0 | 0 | 0 | |
| BND | 0 | 0 | 0 | 0 | 1 | 1 | 1 | 1 | 1 | 1 | 1 | 1 | 1 | 1 | 1 | 1 | |
| BST | 0 | 0 | 0 | 1 | 1 | 1 | 1 | 1 | 1 | 1 | 1 | 1 | 1 | 1 | 1 | 1 | 1 usec. |
| END | 0 | 0 | 1 | 1 | 1 | 1 | 1 | 1 | 1 | 1 | 1 | 1 | 1 | 1 | 1 | 1 | |
| NOP 1 | 1 | 1 | 1 | 1 | 1 | 1 | 1 | 1 | 1 | 1 | 1 | 1 | 1 | 1 | 1 | 1 | |
| INSTRUCTION BIT | | | | | | | | | | | | | | | | | |

TABLE II-continued

| Operation | Operation Code | | | | | | | | | | | | | | | | | Execution Time |
|---|---|---|---|---|---|---|---|---|---|---|---|---|---|---|---|---|---|---|
| NUMBER (OCTAL) | 17 | 16 | 15 | 14 | 13 | 12 | 11 | 10 | 7 | 6 | 5 | 4 | 3 | 2 | 1 | 0 | | |

The mnemonic operation codes for the control instructions are briefly defined as follows:
NOP — No operation (all bits zero)
BND — Branch end: termination of a Boolean branch
BST — Branch start: opens or begins a Boolean sub-branch
END — End of the control program
NOP — No operation (all bits one)

A third general type of control program instruction is executed by the controller processor 11 to operate on a data word stored in the memory 1. These instructions are referred to hereinafter as transfer and arithmetic instructions and are characterized by an operand address which indicates the address of a word in the memory 1. These instructions transfer sixteen-bit words between the memory 1 and the controller processor 11 and perform operations on them.

TABLE III

| Operation | Operation Code | | | | | | | | Operand Address | Execution Time |
|---|---|---|---|---|---|---|---|---|---|---|
| PUT | 0 | 1 | 0 | 0 | X | 0 | 1 | X | | |
| GET | 1 | 0 | 0 | 0 | X | 0 | 1 | X | | 2 μsec. |
| EQU | 1 | 0 | 1 | 0 | X | 0 | 1 | X | | |
| LES | 1 | 0 | 1 | 1 | X | 0 | 1 | X | | |
| INSTRUCTION BIT NUMBER (OCTAL) | 17 | 16 | 15 | 14 | 13 | 12 | 11 | 10 | 7 6 5 4 3 2 1 0 | |

The mnemonic operation codes for the above arithmetic instructions are briefly defined as follows:
PUT — If conditions are true write the number stored in the processor data accumulator in the selected memory line, otherwise, do nothing.
GET — Fetch the word on the selected memory line and store in the processor data accumulator.
EQU — Is the value stored in the processor data accumulator equal to the value stored on the selected memory line?
LES — Is the value stored in the processor data accumulator less than the value stored on the selected memory line?

Reference is made to the above cited patent entitled "Programmable Logic Controller" for a more complete description of the structure of the controller processor 11 and the manner in which it functions to execute each of the above types of program instructions.

The protected program 4 and control program 5 stored in the memory 1 are comprised of a sequence of the above type controller instructions which have been entered by the user via the program loader module 21. These controller instructions are executed in sequence by the controller processor 11 and when the end of program instruction 6A is executed, the processor program counter (not shown in the drawings) is reset to commence executing the protected program 4 and control program 5 again. The protected program 4 and control program 5 are thus repeatedly executed, or scanned, and it is a major objective in this art to maintain this scan time at a minimum. A scan time of less than twenty milliseconds is desired in most industrial applications.

The protected program 4 is preceded by a set of controller instructions that determine whether or not the protected program instructions can be executed. These instructions, hereinafter referred to as the protection check instructions, accomplished this by examining the state of the status register 3 to ascertain whether the program protection module has checked the accuracy of the protected program instructions. If the protected program 4 has been checked and found to be correct, the scan continues normally. Otherwise the read/write line 8 is held in its logic low "read" state for the remainder of the scan so that the state of the I/O image table 2 and, therefore, the state of the controlled operating devices on the machine 19 cannot be altered. Referring to FIG. 1, the read/write line 8 is controlled by a D-type flip-flop 100 which has its D input 101, its clock input 102 and its reset terminal 103 connected to the controller processor 11. Its Q output 104 connects to one input of an AND gate 105 and the AND gate 105 couples the read/write line 8 to the memory 1.

The D-type flip-flop 100 is clocked in response to protection check controller instructions with the operand address 377 (10). When this operand address is accompanied by and OTU operation code, a logic signal is generated to the reset terminal 103 which resets the flip-flop 100 and enables the AND gate 105. On the otherhand, when an OTL operation code accompanies the operand address 377 (10), the logic state of the main decision flip-flop in the control processor 11 is applied to the D input 101 of the flip-flop 100 and it is either set or reset. The D-type flip-flop 100 is thus treated as an operating device which can be set or reset depending on the state of previously examined status bits.

The protection check instructions are employed as follows to "protect" the program 4.

| Controller Instruction | Comments |
|---|---|
| OTU 377 (10) | Unlatch read/write line 8. |
| XIC 276 (00) | If bit 0 in status register 3 is set, |
| BST | or, |
| XIC 276 (01) | If bit 1 in status register 3 is set, |
| BND | |
| OTE 276 (00) | Set bit 0 in status register 3, otherwise, reset bit 0. |
| XIC 276 (00) | Examine the state of bit 0 in status register 3. |
| OTL 377 (10) | If bit 0 in status register 3 is set enable read/write line 8, otherwise, disable read/write line 8. |
| PROTECTED PROGRAM | |

| Controller Instruction | Comments |
|---|---|
| -continued | |
| INSTRUCTIONS OTE 276 (02) | End of protected program word 6. |
| CONTROL PROGRAM INSTRUCTIONS END | End of program word 6A. |

The first of the above instructions is executed at the beginning of each scan to release the read/write line 8 by resetting the D-type flip-flop 100. The instructions which follow examine the state of the status register 3 and the final instruction, OTL 377(10), which immediately precedes the protected program 5 either sets the flip-flop 100 to hold the read/write line 8 or allows it to remain operable. The end of protected program word 6 separates the protected program 4 from the remainder of the control program 5 and as will become apparent from the description to follow, its function is to define for the protected program module the last controller instruction which it is to check.

It should be apparent from the above description that before a sucfessful check is made of the protected program 4 the read/write line 8 is held in its read state by the flip-flop 100. This is done not only during the scan through the protected program 4, but also through the control program 5. This can be altered if desired by moving the OTU 377 (10) instruction from its position shown above at the beginning of the scan to the memory location immediately following the end of protected program word 6. With such an alteration the read/write line 8 will be unlatched during execution of the control program 5 regardless of the state of the program protection apparatus.

The operation of the program protection module and the manner in which it interacts with the programmable controller will now be explained with reference to the flow charts of FIGS. 5–7. The microprocessor machine instructions which direct the operation of the program protection module are stored in the read-only memory 26 along with the "standard" against which the protected program 4 is to be compared. These machine instructions are sequentially read out of the memory 26 and into the instruction register of the microprocessor 29 where they are executed.

Figure 5:
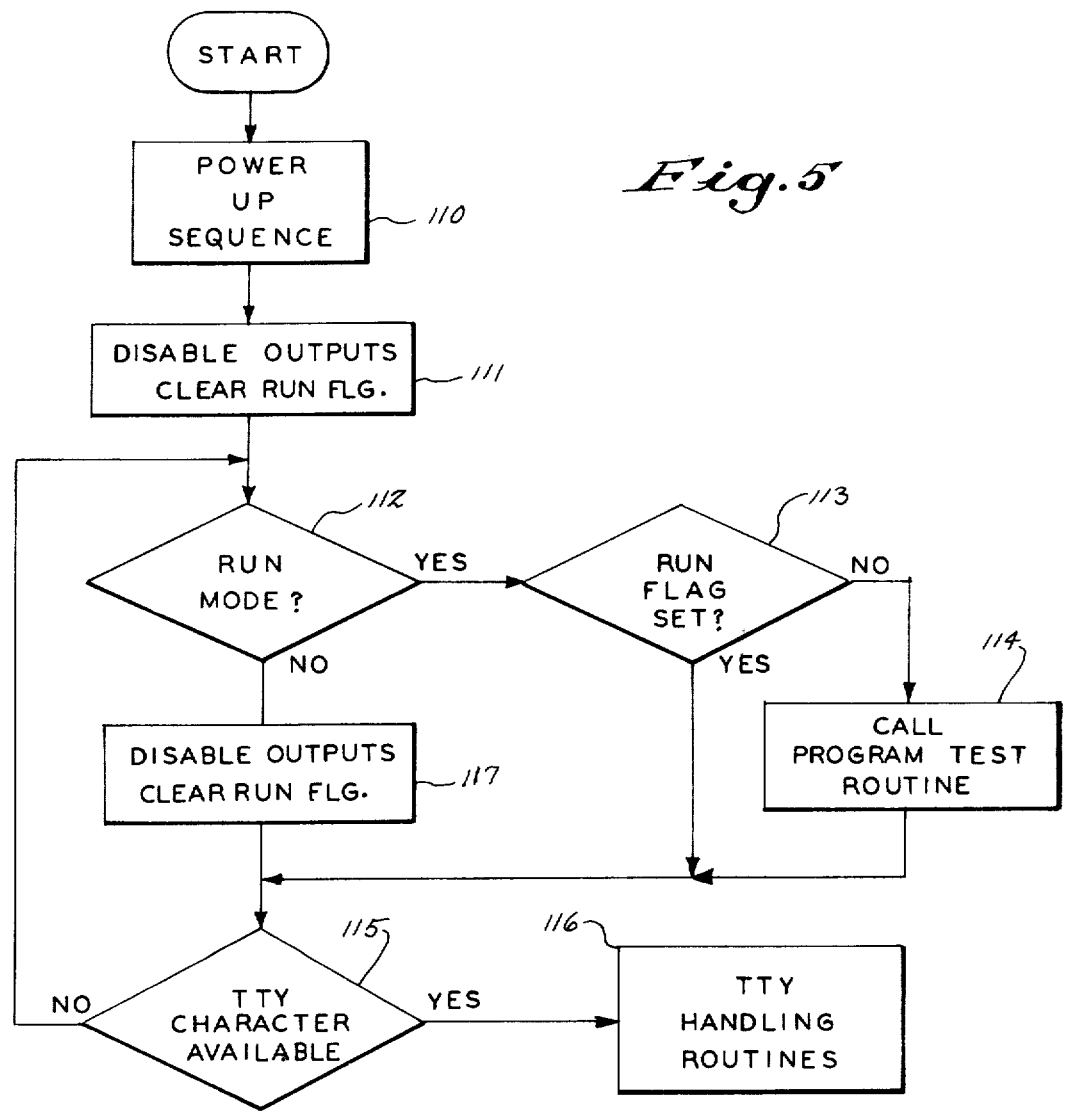

Referring particularly to FIG. 5, when the system is first turned on, or powered up, the program protection module is initialized as indicated by process block 110. As indicated separately by process block 111, this initialization includes disabling all output circuits on the programmable controller by driving the reset line 141 thereon to a logic high voltage and by clearing a RUN flag which is stored in the random access memory 25. A loop is then entered which continuously monitors the mode in which the programmable controller is operating. As indicated by decision block 112, a set of instructions determine if the controller is in the run mode, and if it is, a second set of instructions indicated collectively by decision block 113 test the RUN flag to determine whether or not it is set. If it is not set a program test routine 114 illustrated by the flow charts in FIGS. 6 and 7 is called up to compare each controller instruction in the protected program 4 with the "standard" program stored in the module read-only memory 26. If conditions are proper, the routine 114 sets the RUN flag and the system next determines whether or not a TTY character is present at the UAR/T 59. This is accomplished by instructions which are indicated collectively by decision block 115, and if a character is available, the system branches to the TTY handling routines 116. If not, the system loops back to the decision block 112 to again monitor the mode of the programmable controller.

When the programmable controller is switched out of the run mode, a set of instructions indicated by process block 117 disable the controller output circuits through the reset line 141 and clear the RUN flag. When switched back to the run mode, therefore, the output circuits remain disabled and the system branches to the program test routine 114 to ascertain whether or not the protected program 4 is still intact and can be executed. If not, the output circuits remain disabled and the error light 136 on the program protection module is energized.

Figure 6:
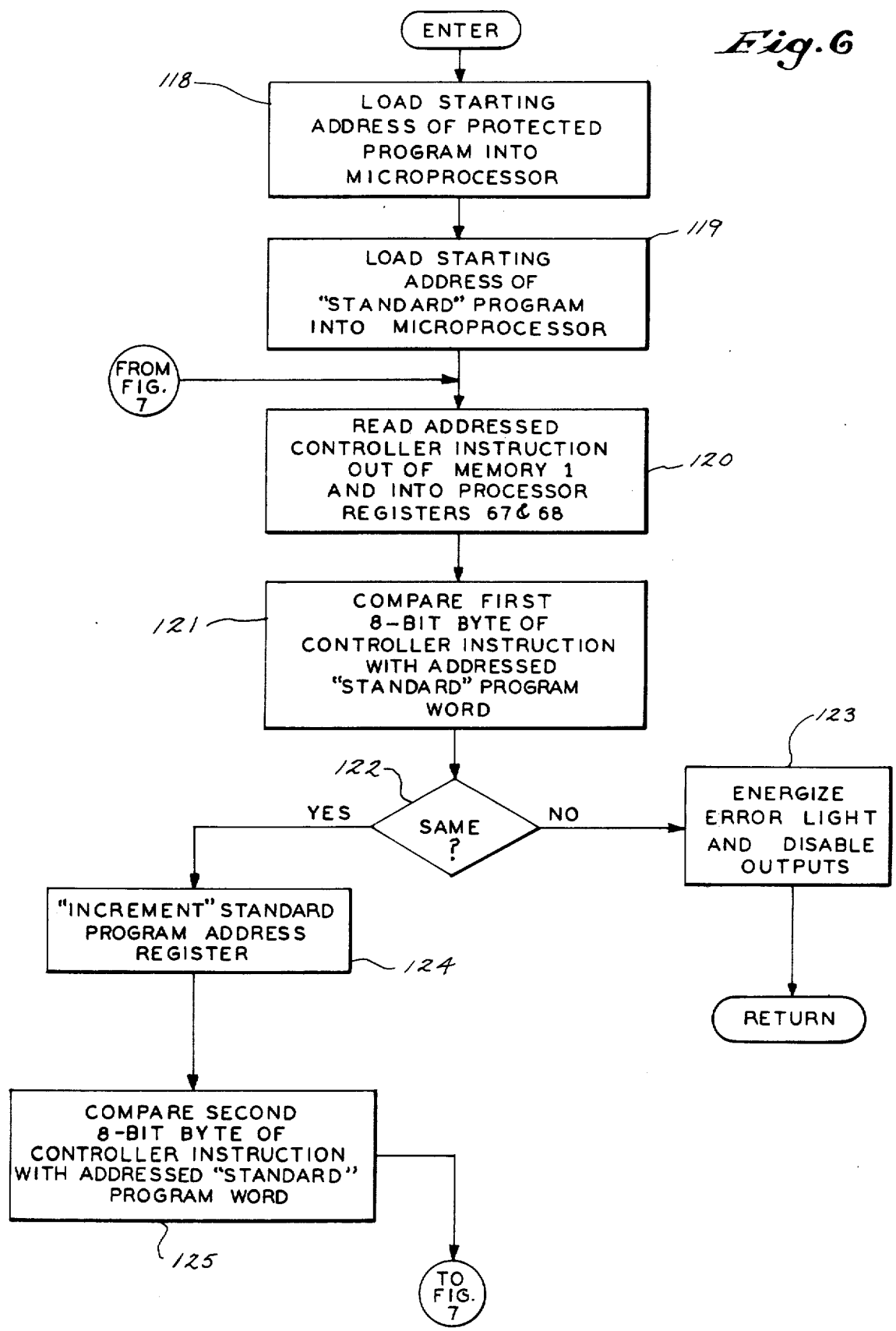
Figure 7:
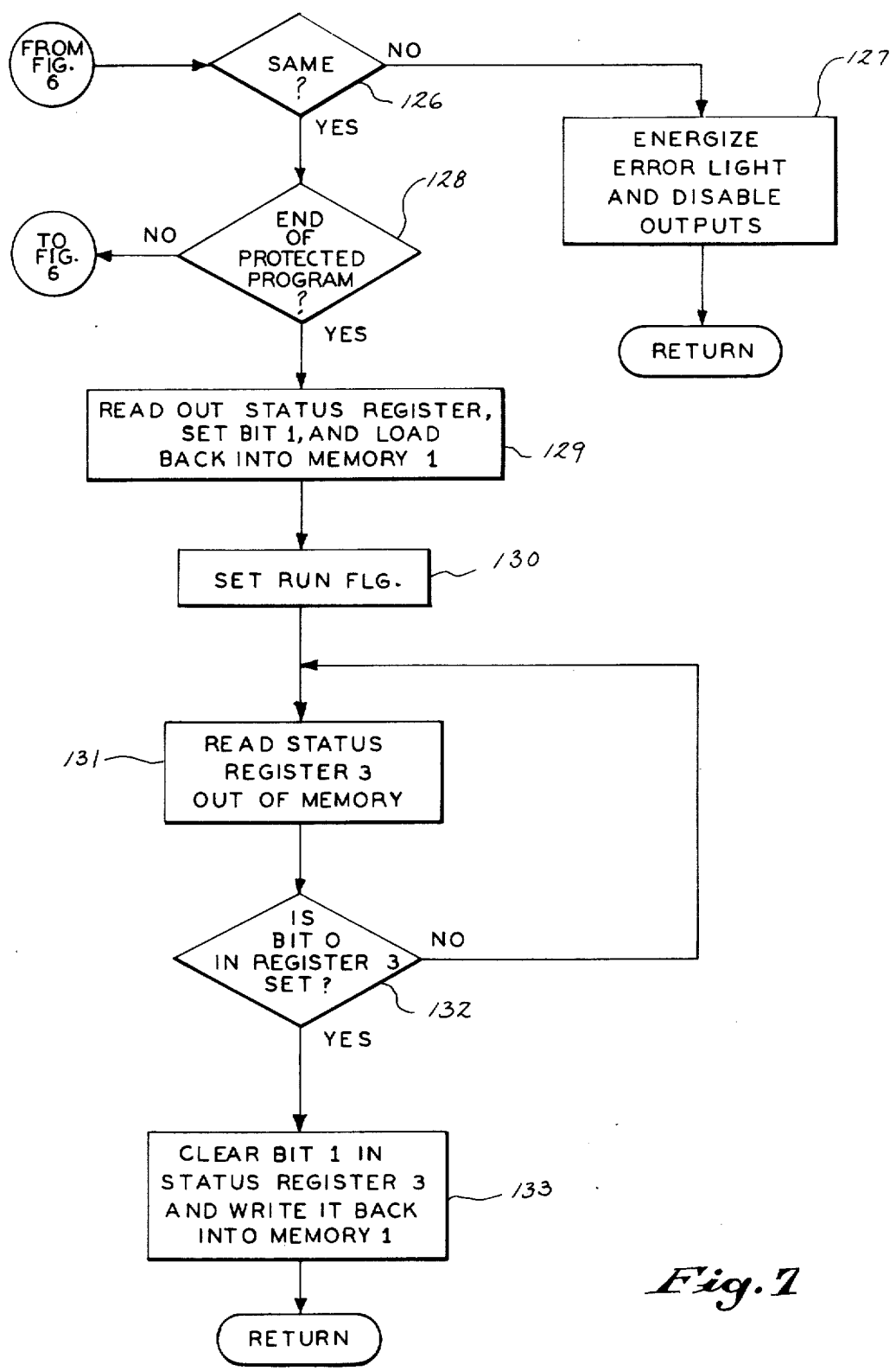

Referring to FIGS. 6 and 7, the program test routine 114 first loads the starting address of the protected program 4 into the microprocessor, as indicated by process block 118. The starting address of the "standard" program stored in the read-only memory 26 is then loaded into the microprocessor as indicated by process block 119, and the first controller instruction in the protected program 4 is then read out of the memory 1 and stored in the module registers 67 and 68 as indicated by process block 120. The controller instruction in the registers 67 and 68 is then compared with the first controller instruction stored in the read-only memory 26, but since the microprocessor operates with eight-bit bytes, the sixteen-bit comparison is performed in two steps. The first step indicated by process block 121 and decision block 122 is to compare the first half of the controller instruction stored in register 67 with the contents of the addressed line in the "standard" program. If they are identical the process continues, but if not, the system branches to process block 123 to disable the output circuits on the programmable controller by driving the reset line 141 high, and to energize the error light 136 on the program protection module.

If the first eight-bit byte of the controller instruction is identical, the program counter in the microprocessor 29 is incremented one count to address the next eight-bit word in the "standard" program, as indicated by process block 124. This byte is then compared with the second half of the controller instruction stored in the register 68 as indicated by process block 125 and decision block 126. If identity is not found, the system branches to process block 127 to energize the error light 136 and to disable the controller output circuits. If identity is found, the controller instruction is then analyzed to determine whether or not it is the end of protected program word 6 (OTE 27602). This is accomplished by a set of instructions indicated by decision block 128 which loop the system back to process block 120 to read out the next controller instruction when the word 6 is not present.

After all controller instructions in the protected program 4 have been successfully compared with the "standard" program, the status register 3 is read out of the memory 1 and into the microprocessor 29. As indicated by process block 129 in FIG. 7, bit 1 in the status register word is set to a logic one state and the entire word is loaded back into location 276 in the controller memory 1. The RUN flag in the module random access memory 25 is set as indicated by process block 130 and the system then waits in a loop which is established by a process block 131 and a decision block 132. This loop allows the programmable controller processor 11 time to scan the protection check instructions which precede the protected program 4 and to respond to the change made by the program protection module in the status register 3.

Referring again to the above listed protection check instructions, the XIC 276(01) instruction detects that bit 1 in the status register has been set, and as a result, the OTE 276(00) instruction which follows sets bit 0 in the status register 3. Referring back to FIG. 7, the status register 3 is read out of the memory 1 and examined to determine if bit 0 therein has been set, and if it has as indicated by process block 133, bit 1 in the status register is cleared to zero and the resulting word is written back into memory location 276 in the memory 1. Because bit 0 in the status register 3 is set, the OTL 377 (10) instruction which follows resets the flip-flop 100 to release the read/write line 8 during the remainder of the scan.

If the program protection module is disconnected or inoperative, the protection check instructions operate to disable, or latch the read/write line 8 in its read state. Without the program protection module bit 1 in the status register cannot be set to 1 and as a consequence, bit 0 therein will not be set. The OTL 377 (10) instruction will thus set the flip-flop 100 to disable the read/write line 8.

Although a preferred embodiment of the invention has been described it should be apparent to those skilled in the art that a number of variations are possible. For example, the protected program instructions are read out and compared to the standard program in the read-only memory in the preferred embodiment, but it is also possible to simply write the standard program into the controller memory at the proper location each time the controller is switched to the run mode.

We claim:

1. In a programmable controller having a memory which stores a control program, a processor which operates in a run mode to read out the control program instructions and execute them, and I/O interface means coupled to said memory and said processor for connecting the programmable controller to sensing devices and operating devices on a machine to be controlled, the improvement therein of a program protection module which comprises:

means for storing a standard control program which comprises a plurality of control program instructions;

means for reading control program instructions from said programmable controller memory and from said standard control program storing means;

means for comparing each control program instruction read from said standard control program storing means with a corresponding control program instruction read from said programmable controller memory;

means coupled to said comparing means for indicating that a control program instruction read from said programmable controller memory is not identical to its corresponding control program instruction read from said standard control program storing means; and a status register coupled to said comparing means for storing a status bit which indicates that all control program instructions in said standard control program storing means are identical to their corresponding control program instructions in said programmable controller memory.

2. The improvement as recited in claim 1 which includes means coupled to said comparing means for decontrolling the operating devices on the machine being controlled when a control program instruction read from said programmable controller memory is not identical to its corresponding control program instruction read from said standard control program storing means.

3. The improvement as recited in claim 1 which includes means associated with said controller processor for examining the state of said status register and means coupled to said last named means for disabling said processor from executing control program instructions read from said memory when said status bit is not present.

4. A program protection module for a programmable controller having a memory which stores a control program, a processor which sequentially reads out the control program instructions from the memory and executes them, and I/O interface means coupled to said memory and said processor for coupling status data from a plurality of sensing devices to said programmable controller and for coupling status data from said programmable controller to a plurality of operating devices, said program protection module comprising:

a read-only memory which stores a standard control program;

means for sequentially reading control program instructions from said controller memory;

means for sequentially reading standard control program instructions from said read-only memory;

means for comparing each control program instruction read from said controller memory with a corresponding standard control program instruction read from said read-only memory; and means associated with said comparing means for indicating that the control program is not identical to the standard control program.

5. The program protection module as recited in claim 4 in which said indicating means includes means for visually indicating the lack of identity.

6. The program protection module as recited in claim 4 in which said indicating means includes means coupled to said controller I/O interface means for decontrolling the operating devices connected thereto when a lack of identity is found.

7. The program protection module as recited in claim 4 in which said indicating means includes a status register associated with said controller processor which is set to a predetermined state when a lack of identity is found.

8. The program protection module as recited in claim 7 in which protection check instructions are stored in said controller memory immediately preceeding said control program and said controller processor executes said protection check instructions to examine the state of said status register and to effectively jump said control program if said status register is in said predetermined state.

9. The program protection module as recited in claim 8 which includes means associated with said controller processor for preventing the writing of data into said controller memory when the status register is examined and found to be in said predetermined state.

* * * * *